(12) United States Patent
Yasutake

(10) Patent No.: US 6,593,571 B1
(45) Date of Patent: Jul. 15, 2003

(54) SCANNING PROBE MICROSCOPE

(75) Inventor: Masatoshi Yasutake, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/483,727

(22) Filed: Jan. 14, 2000

(30) Foreign Application Priority Data

Jan. 18, 1999 (JP) .............................. 11-9608

(51) Int. Cl.[7] .......................... G01R 11/00; H01J 37/00
(52) U.S. Cl. ...................................... 250/306; 250/307
(58) Field of Search ................................ 250/306, 307, 250/234; 73/105

(56) References Cited

U.S. PATENT DOCUMENTS 5,825,020 A * 10/1998 Hansma et al. ............. 250/216
5,929,643 A * 7/1999 Sakai et al. ................. 324/750
6,079,255 A * 6/2000 Binnig et al. ................ 73/105

FOREIGN PATENT DOCUMENTS

JP 4-11038021 A * 2/1999
JP 0-2000088735 A * 3/2000

* cited by examiner

Primary Examiner—John R. Lee
Assistant Examiner—Anthony Quash
(74) Attorney, Agent, or Firm—Adams & Wilks

(57) ABSTRACT

A scanning probe microscope has a cantilever section comprised of a single cantilever chip, at least one first conductive cantilever having a first probe at a free end thereof and extending from the single cantilever chip, and at least one second cantilever extending from the single cantilever chip and disposed in side-by-side relation to the first conductive cantilever. The second cantilever has a second probe at a free end thereof and a length shorter than that of the first conductive cantilever. A Z-direction rough movement mechanism moves the first conductive cantilever in the Z-direction at a first velocity to bring the first probe into contact with a surface of a sample. The Z-direction rough movement mechanism moves the second cantilever in the Z-direction at a second velocity lower than the first velocity when the first probe contacts the surface of the sample to bring the second probe in the vicinity of the surface of the sample for measuring a shape of the surface of the sample.

23 Claims, 6 Drawing Sheets

SCANNING PROBE MICROSCOPE

BACKGROUND OF THE INVENTION

1. Field of the Invention

The present invention relates to a scanning probe microscope (spm) with improved Z rough movement control for preventing electrification on a measurement sample and for providing high precision measurement.

2. Background Information

A conventional Z rough movement mechanism for a scanning probe microscope has a mechanical mechanism using a contraction lever or mechanism in which an actuation screw is driven by a pulse motor. Furthermore, end detection in Z rough movement feed has been made by detecting a deflection amount of the cantilever or a time point at which the vibration amplitude attenuation exceeds a set value. Also, prevention against electrification on a sample surface has been made by neutralizing charges by previously radiating ion spray to a sample surface or releasing the sample surface charges by using a conductive cantilever.

In the conventional scanning probe microscope, a fine cantilever with a probe needle is mechanically scanned using a piezoelectric scanner to make information of a cantilever deflection amount into an image. Here, when the cantilever is approached to a sample surface (Z movement), a probe needle tip is liable to be broken due to snap-in when the cantilever is drawn due to a sample surface force, electrostatic force electrified on the sample surface or the like. Furthermore, if the cantilever is approached to a sample surface at high speed, the probe needle tip or, as the case may be, the cantilever itself is broken by impact due to contact with the sample surface. That is, there has been a problem that Z rough movement is impossible to perform. Further, for an insulation sample with electrification nature, there has been cases that charges ar accumulated on a sample surface by friction between a sample and a probe needle due to scanning of the probe needle even during measurement with a result that measurement is impossible to be performed in a stable manner.

SUMMARY OF THE INVENTION

In order to solve the foregoing problems in the conventional art, the present invention is structured to have, in a cantilever section, a plurality of measurement and conductive Z distance control cantilevers. In the present invention, the Z distance control cantilever is soft with a spring constant of 0.01–0.1 N/m and round with a tip diameter of 100–200 nm, thereby providing a structure which is not damaged even if brought into contact with the sample surface at high speed. Furthermore, Z rough movement control is switched by a deflection signal of the Z distance control cantilever to provide a structure in which the measurement cantilever is slowly fed to a sample surface vicinity.

DETAILED DESCRIPTION OF THE PREFERRED EMBODIMENTS

Figure 3A:
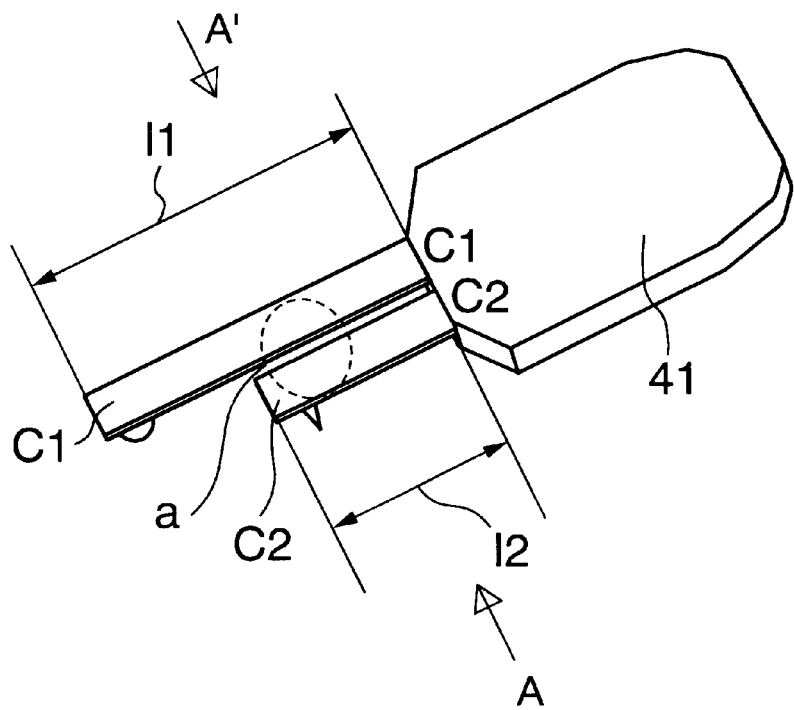
FIG. 3(a) is a perspective view of a cantilever section of the scanning probe microscope according to the present invention.
Figure 3B:
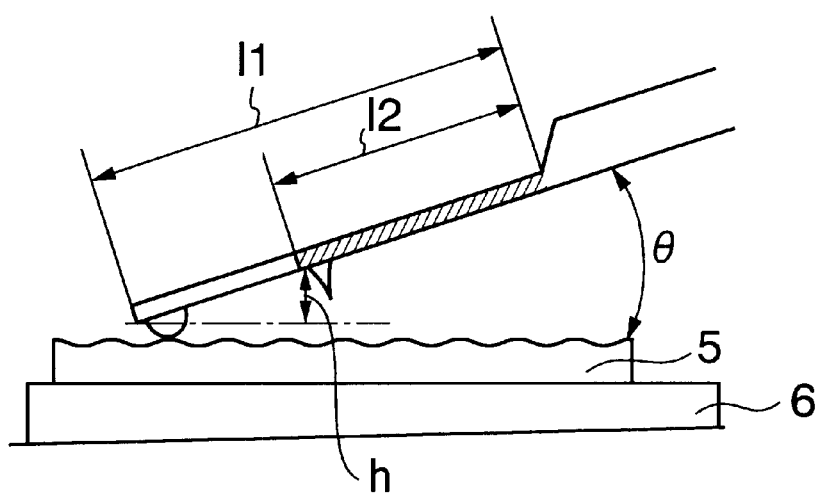
FIG. 3(b) is a view taken along line 3(b)—3(b) in FIG. 3(a)
Figure 4:
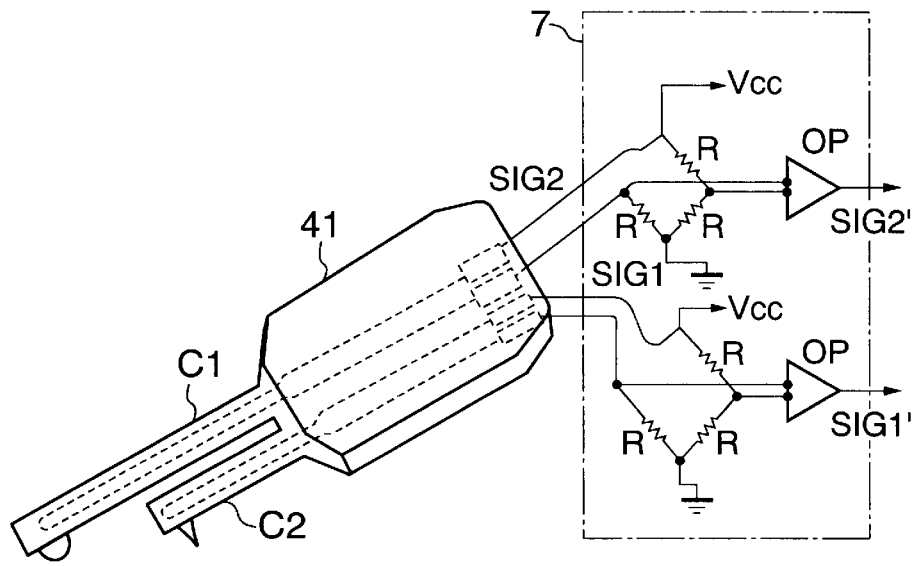
FIG. 4 is a perspective view of another embodiment of a cantilever section according to the present invention.
Figure 5:
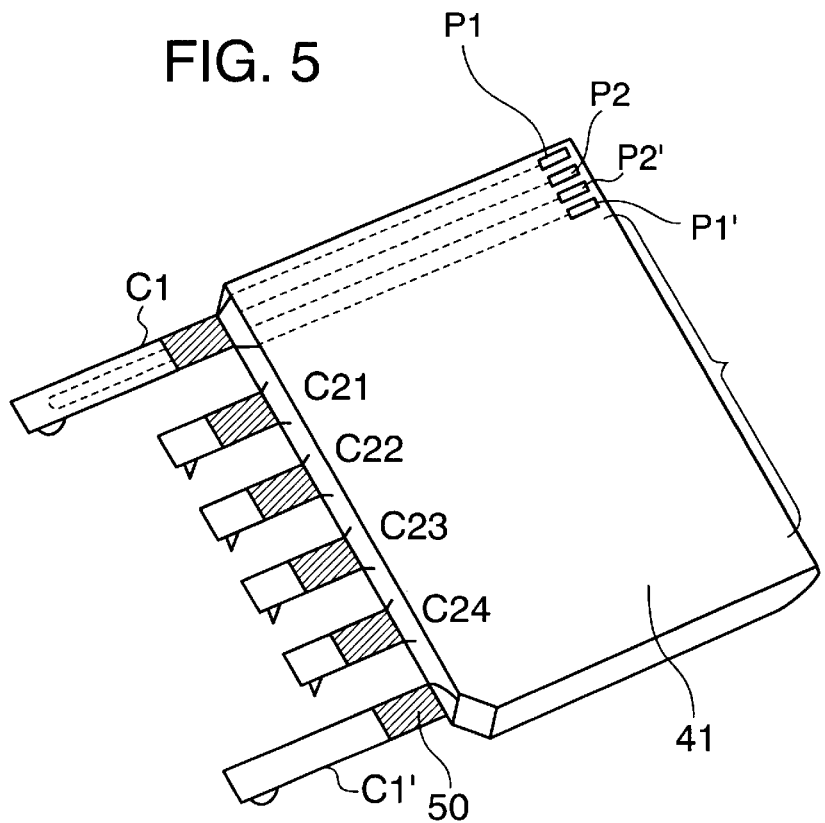
FIG. 5 is a perspective view of another embodiment of a cantilever section according to the present invention.

The Z distance control cantilever is given conductivity and made longer than the measurement cantilever, so that a plurality of cantilevers are formed on a same chip as shown in FIG. 3–FIG. 5. The displacement of the cantilevers may be detected using a piezoelectric resistive resistor as in the thesis by M. Tortonese, R. C. Barrett, C. F. Quate Appl. Phys. Lett. 62(8) 1993, 834, or by using an optical lever detector as shown in FIG. 3 and FIG. 6.

These cantilevers are initially disposed at a distance of several mm from a sample surface.

The cantilever sections are moved close to the sample surface at high speed. At first, the Z distance control cantilever which is long in length is put into contact with the sample to generate a deflection signal. Due to this deflection signal, the Z rough movement feed speed is switched to a low speed. Next, the measurement cantilever is moved close to a sample surface vicinity and fed at low speed until entering a measuring range. Explanation is made in greater detail below in the mode for practicing the invention.

Figure 1:
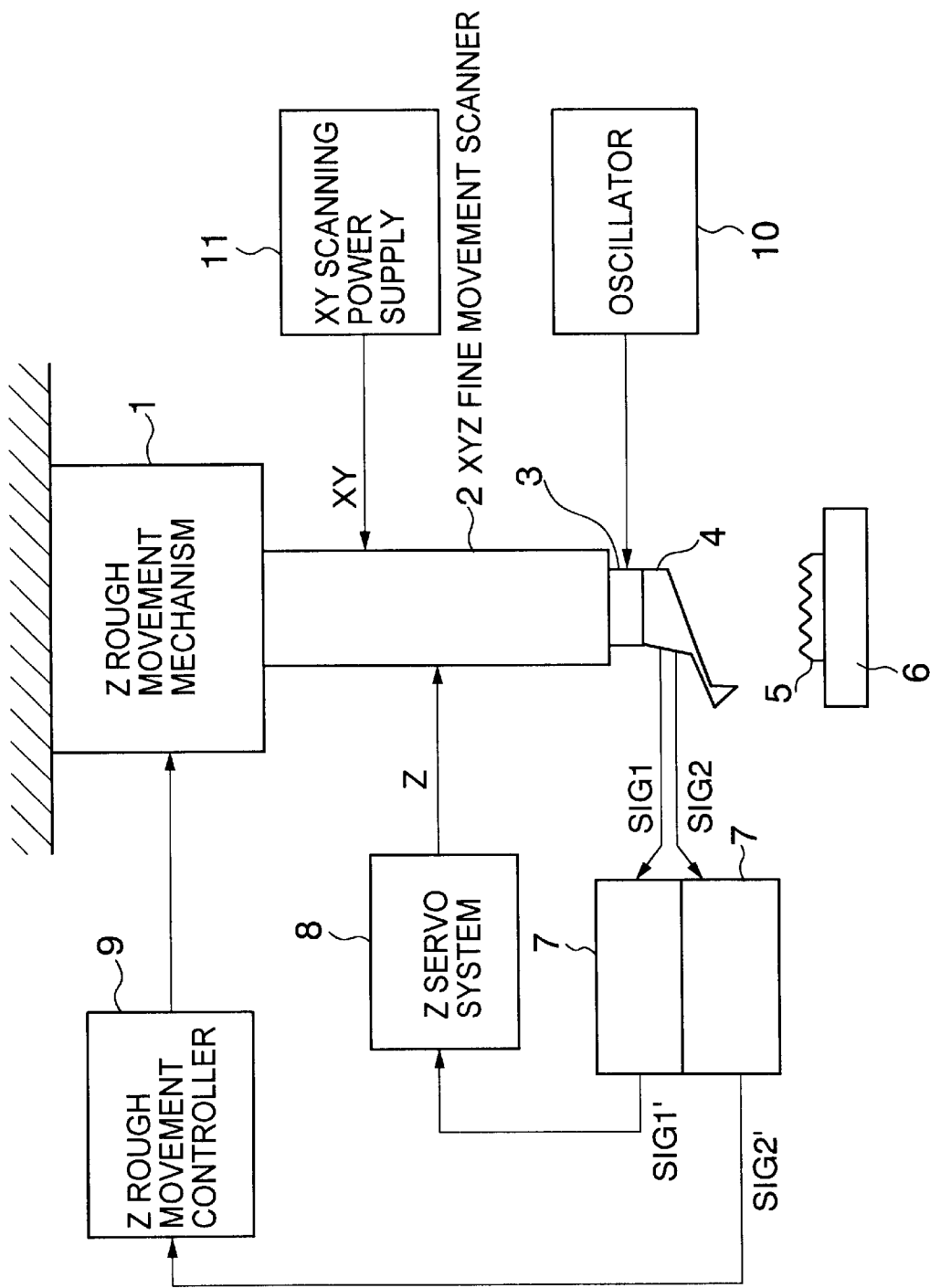
FIG. 1 is a block diagram of the scanning probe microscope according to the present invention.
Figure 2:
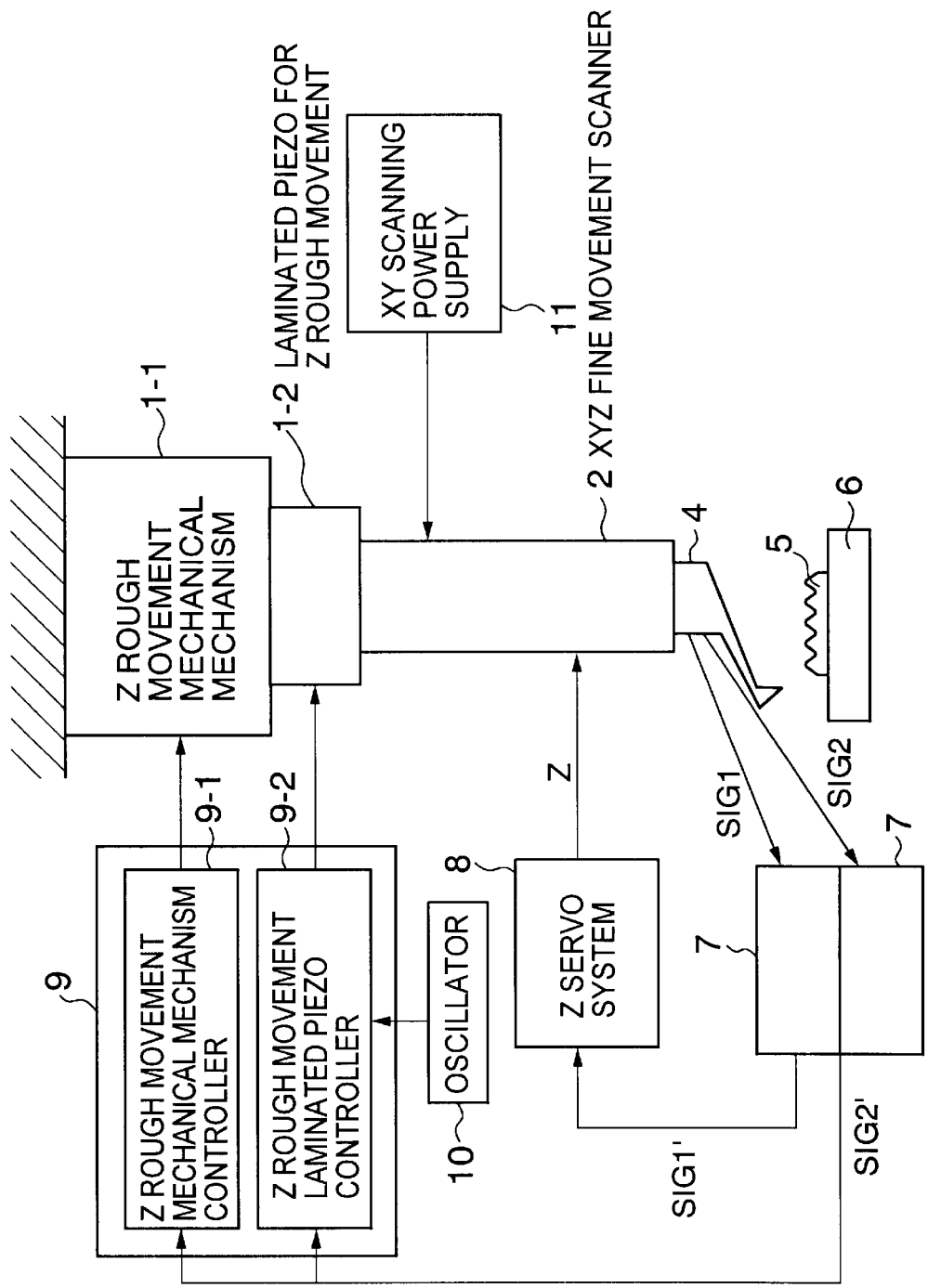
FIG. 2 is another embodiment of a scanning probe microscope according to the present invention.

Hereinunder, an embodiment according to the invention will be explained below based on the drawings. FIG. 1 is a typical view of a scanner section of an AFM. FIG. 2 is a typical view of a scanner of the AFM wherein a Z rough movement system is shown in greater detail.

A principal part of an apparatus will be explained using FIG. 1 and FIG. 2. A cantilever section 4 is attached to a Z rough movement mechanism 1 through a piezoelectric vibration plate 3 fixed with a XYZ fine movement scanner 2. The cantilever is opposed to a sample 5 fixed on a sample table 6. In FIG. 1, the cantilever section 4 is assumed as a self-sensing cantilever as shown in FIG. 4. The signal from a cantilever for measurement shown in FIG. 4 is amplified by an amplifier 7 and inputted to a Z servo system 8. The Z axis of the XYZ scanner 2 is expanded and contracted by the output signal to control a distance between a probe needle and sample such that a deflection amount in the cantilever for measurement becomes constant. On the other hand, the signal from a cantilever for controlling Z distance shown in FIG. 4 is similarly amplified by the amplifier 7 and inputted to the Z rough movement controller 9, thus being used as a control signal to the Z rough movement mechanism 1. An oscillator 10 is connected for oscillating the piezoelectric vibration plate 3, and an XY scan power supply 11 is for XY-scanning the XYZ fine movement scanner 2.

FIG. 2 shows a detail of the Z rough movement mechanism shown in FIG. 1. The Z rough movement mechanism is mainly structured by a Z rough movement device 1-1 comprising a mechanical system such as a differential screw or a contraction lever and being capable of moving by approximately mm, and a Z rough movement piezoelectric device 1-2 capable of moving by 0.1 mm order by a laminated piezo or the like, respective of which are connected to a Z rough movement mechanism controller 9-1 and a Z rough movement piezoelectric controller 9-2. Here, high speed feed is made from several mm to 0.1–0.3 mm above a sample by the Z rough movement device 1-1 and low speed feed is made for the remaining 0.1–0.3 mm or less by the Z rough movement piezoelectric device 1-2.

Next, explanation is made on cantilever sections shown in FIG. 3–FIG. 5. FIG. 3 is a cantilever section using an optical lever detector as shown, for example, in FIG. 6, for cantilever displacement detection. FIG. 4 is a cantilever section using a self-detecting cantilever for detecting cantilever displacement by the cantilever itself. FIG. 5 is another embodiment of a cantilever having three or more cantilevers.

Hereinunder, explanation is made centering on FIG. 3. FIG. 3(a) is a perspective view of a cantilever section according to the present invention. The cantilever section is structured by a cantilever c1 [length 11: 400–1000 μm] long in length for Z distance control and a cantilever c2 [length 12: 100–500 μm] short in length for measurement such that they are juxtaposed on a cantilever base 41 (a center-to-center distance of the cantilevers is 100–200 μm or less). Also, the Z distance control cantilever is provided with conductivity by coating a needle tip with a conductive metal such as gold.

Viewing now the cantilever section from a side as shown in FIG. 3(b), the cantilever section is structured such that, when the Z distance control cantilever c1 at its needle tip contacts with a sample surface, the measurement cantilever c2 at its end floats than an end of the Z distance control cantilever c1 by a height h<100–300 μm (h=(11–12) sin θ; 11: a length of the Z distance control cantilever, 12: a length of the measurement cantilever, θ: a cantilever attaching angle) from the sample surface. Also, the distance control cantilever c1 has a tip radius of approximately 100–200 nm and a spring constant of 0.01–0.1 N/m, respective of which are 5–10 times a tip radius of the measurement cantilever c2 and 1/8th–1/10th of a spring constant thereof. Accordingly, even if the Z distance control cantilever is contacted with a sample surface at high speed, there is less damage to the cantilever or sample surface.

FIG. 4 is another embodiment using a self-sensing cantilever to perform displacement detection by a piezoelectric resistor buried in the cantilever, although an outer shape of the cantilever is similar to FIG. 3. A given current is flowed to the piezoelectric resistor to capture as a piezoelectric resistance change a deformation due to displacement of the cantilever, which is detected as a current change by a bridge circuit. In FIG. 4, R represents a resistance, Vcc a bias voltage and OP an operational amplifier. c1 and c2 are respectively a Z distance control cantilever and a measurement cantilever.

FIG. 5 is another embodiment of a cantilever section arranged with Z distance control cantilevers c1, c1' at respective ends and a plurality of measurement cantilevers c2 at center, for a purpose of reducing the number of times to replace a cantilever. For displacement detection, a self-detecting cantilever as explained in FIG. 4 is used. The arrangement of the Z distance control cantilevers c1, c1' at respective ends is by reason of sideway long base for the cantilever section and hence tilt in the base for the cantilevers relative to a sample surface. In this case, it is satisfactory to perform control using a signal of either one of Z distance control cantilevers c1 closer to the ample surface. Also, piezoes 50 for cantilever top and bottom are evaporated of zinc oxide, etc. at cantilever base on each of the cantilevers to provide a mechanism to vertically move the cantilever due to piezo expansion and contraction and switch the cantilever to be used for measurement.

Figure 6A:
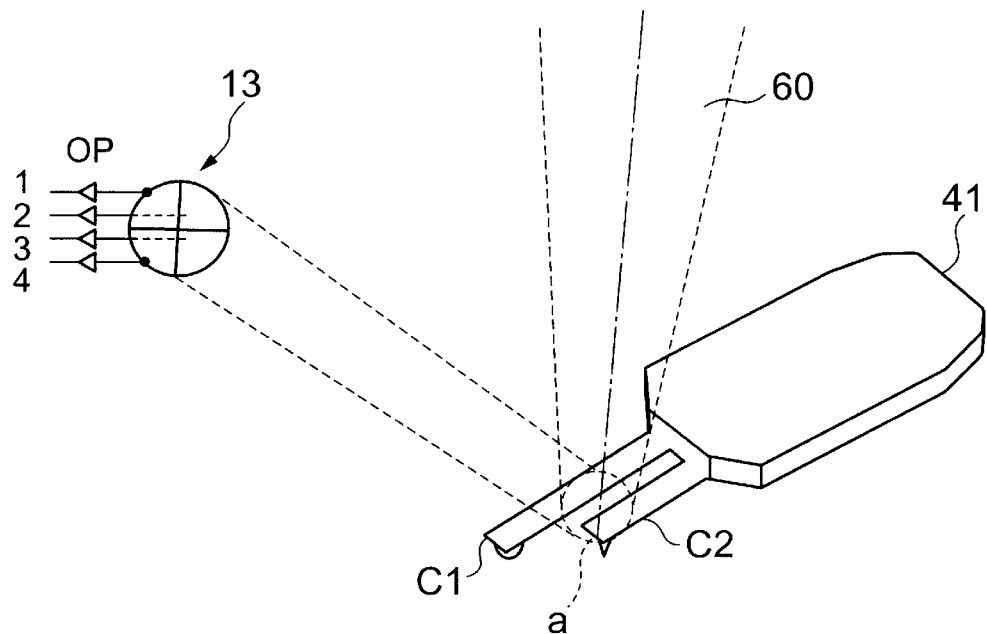
FIG. 6(a) is a view of a detection system using an optical lever.
Figure 6B:
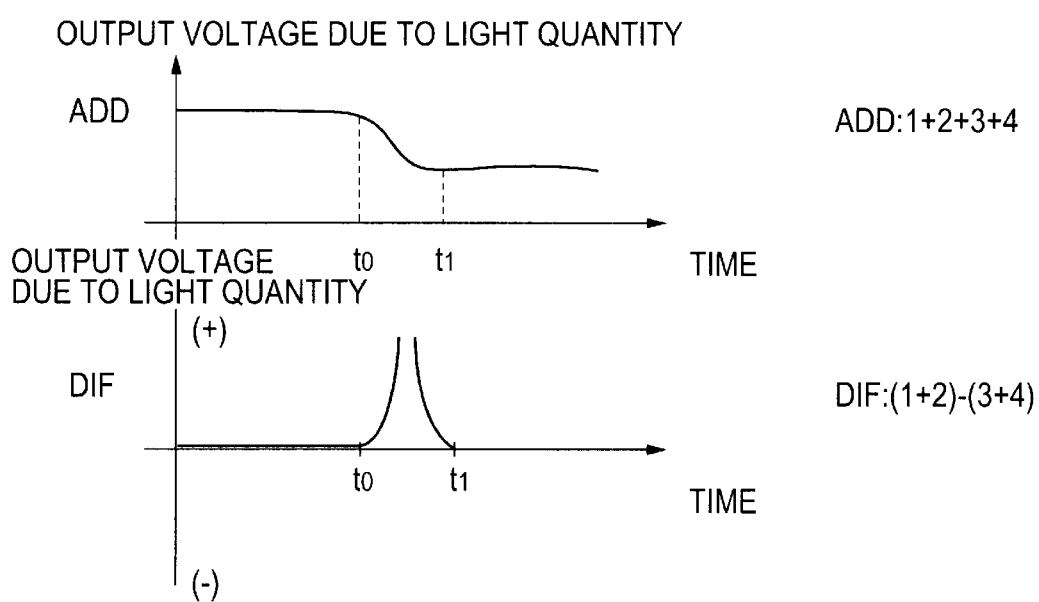
FIG. 6(b) is an operational view of a detection system using an optical lever.

Next, explanation is made on the operation of Z rough movement using FIG. 3 and FIG. 6. At first, the cantilever section is distant by several mm from the sample surface. Now, a laser beam 60 of an optical lever detection system shown in FIG. 6(a) is illuminated to a vicinity of a center position between a tip of the measurement cantilever c2 and the Z distance control cantilever c1. The illumination is denoted by a. Reflection light from the two cantilevers is collected to a four-divided photodetector 13 and converted into an electric signal in the photodetector 13 and then amplified in the operation amplifier OP. Now, as shown in FIG. 6(b), a sum signal of all the segments of the four-divided photodetector 13 is denoted as an ADD signal and a difference between the two segment in a vertical direction is denoted as a DIF signal. When the Z rough movement mechanism 1 is moved at high speed and the Z distance control cantilever c1 contacts the sample surface as in FIG. 3(b) [FIG. 6(b): t0], the Z distance control cantilever is subjected to a force from the sample surface to vary the DIF signal. This signal is inputted to the Z rough movement controller 9 to switch the Z rough movement mechanism 1 to low speed feed. Also, as shown in FIG. 2, this signal may be used to switch control such that high speed feed is made by a Z rough movement device 1-1 while low speed feed is made by a Z rough movement piezoelectric device 1-2 structured by a laminated piezo or the like. Now, at a time point [FIG. 6(b): t0], the measurement cantilever c2 is floating by a distance of about h from the sample surface. Next, pushing is made by about h<100–300 μm at low speed to move a needle tip of the measurement cantilever c2 to a vicinity of the sample surface [FIG. 6(b): t1]. Before this time, the reflection light from the Z distance control cantilever c1 completely goes out of the four-divided photodetector 13 and the ADD signal decreases to half. Thereafter, the signal of the four-divided photodetector 13 reflects only the signal of the measurement cantilever c2. Although herein described is the method of employing displacement signals of two cantilevers by one optical lever, two optical levers may be employed for the respective cantilevers although the apparatus structure becomes complicate.

Furthermore, when using the self-detecting cantilever section shown in FIG. 4, if the signal sig2 from the Z distance control cantilever c1 is inputted to the Z rough movement controller 9 through a pre-amplifier 7 and the signal sig1 from the measurement cantilever c2 is inputted to the Z servo system 8 through the pre-amplifier 7, similar operation is made to the optical lever of FIG. 3 or FIG. 6.

When using a cantilever section having a plurality of self-detecting cantilevers as shown in FIG. 5, if taking an OR signal of the Z distance control cantilevers c1 and c1' at respective ends, even if the cantilever base is attached with inclination, a signal of the closer Z distance control cantilever to the sample surface can be used as a signal for the Z rough movement controller 9. Also, if a signal from the measurement cantilever c2 is inputted to the Z servo system 8 through the pre-amplifier 7, similar operation is made to the optical lever of FIG. 3 or FIG. 6.

Figure 7:
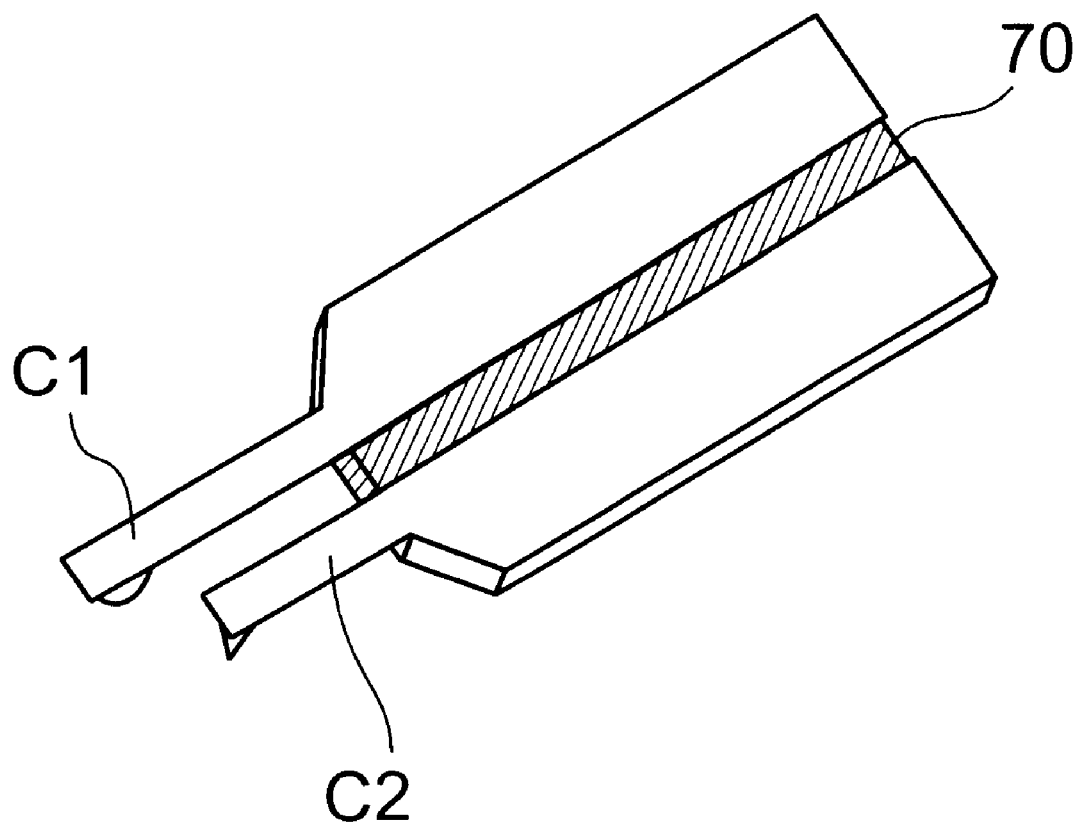
FIG. 7 is a perspective view of another embodiment of a cantilever section according to the present invention.

Finally, explanation will be made on prevention against static electricity charging and abrupt of drawing (snap-in) of the cantilever due to surface tension. The charge from an electrified semi-insulative sample is introduced to a ground through the conductive Z distance control cantilever. Also, for a highly insulative sample, the surface charge on a measurement surface may be flowed to the ground by previously raster scanning a measurement region with the conductive Z distance control cantilever. Also, as shown in FIG. 7, a Z distance control cantilever section may be made conductive which is structured by a cantilever c1 and a cantilever base continuing thereto. Further, this cantilever section and a measurement cantilever structured by a cantilever c2 and a cantilever base continuing thereto may be electrically isolated by an insulator 70 so that the Z distance control cantilever section is connected with an external power supply (not described) to fix the potential on a sample surface to a certain potential.

In snap-in prevention due to sample surface tension, after the Z distance control cantilever contacts a sample surface, the measurement cantilever c2 is approached to the sample surface while vibrating a piezo vibration plate 3 to an amplitude of approximately 10–200 nm with an oscillator 10 with a resonant frequency of the measurement cantilever c2 or an arbitrary frequency when using the laminated piezo shown in FIG. 2. The vibration energy given to the cantilever and the vibration energy given through the Z distance control cantilever reduce abrupt drawing (snap-in) of the cantilever caused due to sample surface tension.

In this embodiment, the cantilever can be moved close to a sample surface at high speed to a sample surface height of from several mm to several μm as explained hereinabove, shortening a time required for Z rough movement.

Furthermore, because the conductive Z distance control cantilever (electrode) is provided in the vicinity of the measurement cantilever, a sample surface can be prevented against electrification. Additionally, the potential on the sample surface is kept constant, thereby enabling prevention against snap-in, etc. due to electrostatic force. Further, snap-in due to a sample surface force was reduced by performing Z rough movement while vibrating both the cantilever section and the sample surface.

What is claimed is:

1. A scanning probe microscope comprising: a cantilever section comprised of a single cantilever chip, at least one first conductive cantilever having a first probe at a free end thereof and extending from the single cantilever chip, and at least one second cantilever extending from the single cantilever chip and disposed in side-by-side relation to the first conductive cantilever, the second cantilever having a second probe at a free end thereof and a length shorter than that of the first conductive cantilever; and a Z-direction rough movement mechanism for moving the first conductive cantilever in the Z-direction at a first velocity to bring the first probe into contact with a surface of a sample and for moving the second cantilever in the Z-direction at a second velocity lower than the first velocity when the first probe contacts the surface of the sample to bring the second probe in the vicinity of the surface of the sample for measuring a shape of the surface of the sample.

2. A scanning probe microscope according to claim 1; further comprising scanning means for scanning the second cantilever over the surface of the sample.

3. A scanning probe microscope according to claim 1; wherein the single cantilever chip has a support section having opposite end portions; and wherein the at least one first conductive cantilever comprises a pair of first conductive cantilevers each extending from a respective one of the end portions of the support section of the single cantilever chip, the second cantilever extending from the support section of the single cantilever chip and being disposed between the pair of first conductive cantilevers.

4. A scanning probe microscope according to claim 1; wherein the single cantilever chip has a support section having opposite end portions; and wherein the at least one first conductive cantilever comprises a pair of first conductive cantilevers each extending from a respective one of the end portions of the support section of the single cantilever chip.

5. A scanning probe microscope according to claim 4; wherein the at least one second cantilever comprises a plurality of second cantilevers extending from the support section of the single cantilever chip and disposed between the pair of first conductive cantilevers.

6. A scanning probe microscope according to claim 1; further comprising a single optical lever-type detector for detecting movement of the first conductive cantilever and the second cantilever by simultaneously illuminating the first conductive cantilever and the second cantilever with a single light beam and for outputting an electrical signal corresponding to the detected movement; and wherein the Z-direction rough movement mechanism moves the first conductive cantilever and the second cantilever in accordance with the electrical signal.

7. A scanning probe microscope according to claim 1; wherein the second probe comprises a needle-type probe.

8. A scanning probe microscope comprising; a cantilever section comprised of a single cantilever chip, at least one first cantilever having a first probe at a free end thereof and extending from the single cantilever chip, and at least one second cantilever extending from the single cantilever chip and disposed in side-by-side relation to the first cantilever, the second cantilever having a second probe at a free end thereof and a length shorter than that of the first cantilever; and means for moving the first cantilever at a first velocity to bring the first probe into contact with a surface of a sample, for outputting an electrical signal corresponding to the contact between the first probe and the surface of the sample, and for moving the second cantilever at a second velocity lower than the first velocity in accordance with the electrical signal to bring the second probe in the vicinity of the sample surface for measuring a shape of the sample surface.

9. A scanning probe microscope according to claim 8, further comprising vibrating means for vibrating the cantilever section and for vibrating the surface of the sample through the first cantilever while in contact with the surface of the sample; and wherein the means for moving the second cantilever includes means for moving the second cantilever to bring the second probe in the vicinity of the sample surface upon output of the electrical signal and while vibrating the cantilever section to prevent an abrupt contact between the second probe and the surface of the sample.

10. A scanning probe microscope according to claim 8; wherein the first probe comprises a conductive material for preventing electrification of the surface of the sample and for maintaining a potential on the surface of the sample constant to prevent an abrupt contact between the second probe and the surface of the sample.

11. A scanning probe microscope according to claim 8; wherein the second probe comprises a needle-type probe.

12. A scanning probe microscope according to claim 8; further comprising scanning means for scanning the second cantilever over the surface of the sample.

13. A scanning probe microscope comprising: a cantilever section comprised of a plurality of cantilevers arranged side-by-side, at least one of the cantilevers having a probe at a free end thereof for undergoing scanning movement over a surface of a sample to measure a shape of the surface of the sample; and a single optical lever-type detector for detecting movement of the cantilevers by simultaneously illuminating the cantilevers with a single light beam and for outputting an electrical signal corresponding to the detected movement; and moving means for moving the cantilevers towards the surface of the sample in accordance with the electrical signal outputted from the single optical lever-type detector.

14. A scanning probe microscope according to claim 13; wherein the plurality of cantilevers comprises at least one first conductive cantilever and at least one second cantilever having the probe and disposed in side-by-side relation to the first conductive cantilever, the second cantilever having a length shorter than that of the first conductive cantilever.

15. A scanning probe microscope according to claim 14; wherein the cantilever section has a support section having opposite end portions; and wherein the at least one first conductive cantilever comprises a pair of first conductive cantilevers each extending from a respective one of the end portions of the support section, the second cantilever extending from the support section and being disposed between the pair of first conductive cantilevers.

16. A scanning probe microscope according to claim 15; wherein the at least one second cantilever comprises a plurality of second cantilevers extending from the support section and disposed between the pair of first conductive cantilevers.

17. A scanning probe microscope according to claim 13; wherein the probe comprises a needle-type probe.

18. A scanning probe microscope according to claim 13; further comprising scanning means for scanning the at least one cantilever over the surface of the sample.

19. A scanning probe microscope comprising:

a cantilever section having at least one first cantilever and at least one second cantilever disposed in side-by-side relation to the first cantilever and having a length shorter than that of the first cantilever;

a movement mechanism for moving the first cantilever to bring a free end of the first cantilever into contact with a surface of a sample and for moving the second cantilever when the free end of the first cantilever contacts the surface of the sample surface to bring a free end of the second cantilever in the vicinity of the sample surface; and control means for controlling the movement mechanism to move the first cantilever at a first velocity and to move the second cantilever at a second velocity lower than the first velocity.

20. A scanning probe microscope according to claim 19; wherein the control means includes means for controlling the movement mechanism to switch from moving the first cantilever at the first velocity to moving the second cantilever at a second velocity when the free end of the first cantilever contacts the surface of the sample.

21. A scanning probe microscope according to claim 19; further comprising a needle-type probe disposed at the free end of the second cantilever.

22. A scanning probe microscope according to claim 19; further comprising scanning means for scanning the at least one first cantilever over the surface of the sample to measure a shape of the surface of the sample.

23. A scanning probe microscope according to claim 19; wherein the first cantilever has a conductive probe for contacting the surface of the sample to maintain a potential on the surface of the sample constant and thereby prevent an abrupt contact between the free end of the second cantilever and the surface of the sample.

* * * * *